(12) United States Patent
Hwang

(10) Patent No.: US 9,354,854 B2
(45) Date of Patent: May 31, 2016

(54) MANAGEMENT SERVER, IMAGE FORMING APPARATUS, METHOD FOR INSTALLING OSGI-BASED SERVICE, AND COMPUTER-READABLE RECORDING MEDIUM

(71) Applicant: Ki-young Hwang, Suwon-si (KR)

(72) Inventor: Ki-young Hwang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 60 days.

(21) Appl. No.: 13/729,447

(22) Filed: Dec. 28, 2012

(65) Prior Publication Data
US 2013/0346963 A1  Dec. 26, 2013

(30) Foreign Application Priority Data

Jun. 25, 2012  (KR) .................. 10-2012-0068167

(51) Int. Cl.
*G06F 9/445* (2006.01)
(52) U.S. Cl.
CPC ... *G06F 8/61* (2013.01); *G06F 8/60* (2013.01)
(58) Field of Classification Search
CPC .................... G06F 8/60; G06F 8/61
USPC .................. 717/101–103, 176–178
See application file for complete search history.

(56) References Cited

U.S. PATENT DOCUMENTS

2005/0227683 A1* 10/2005 Draluk et al. ............ 455/419

OTHER PUBLICATIONS

Colyer et al., "Spring Dynamic Modules Reference Guide", 2009, retrieved from http://docs.spring.io/osgi/docs/2.0.0.M1/reference/pdf/spring-dm-reference.pdf, 123 pages.*
Yuan, "Managed Smart Clients", Mar. 2004, chapter 4, retrieved from http://www.theserverside.com/news/1365171/Managed-Smart-Clients, pp. 51-79.*
Bai et al., "Design and Implementation of an Embedded Home-Gateway for Remote Monitoring based on OSGI Technology", Mar. 2007, Proceedings of the IASTED European Conference Internet and Multimedia Systems and Applications, pp. 63-68.*
Extended European Search Report issued in Application No. 13151791.4 on Jun. 17, 2013.
Diaz Redondo R. P. et al: "Enhancing Residential Gateways: OSGi Service Composition," IEEE Transactions on Consumer Electronics, IEEE Service Center, New York, NY, US, vol. 53, No. 1, Feb. 1, 2007, pp. 87-95, XP011381790, ISSN: 0098-3063, 001: 10.1109/TCE.2007.339507.

* cited by examiner

*Primary Examiner* — Ted T Vo
(74) *Attorney, Agent, or Firm* — Staas & Halsey LLP

(57) ABSTRACT

A management server is provided comprising a user interface unit to receive UI information to provide a new service and a selection of a plurality of functions to perform the new service, a generation unit to generate a virtual bundle including information of a bundle pre-installed in an OSGi framework corresponding to the selected plurality of functions, and an installation unit to install the generated virtual bundle in the OSGi framework.

14 Claims, 22 Drawing Sheets

FIG. 21

```
<xoa-s-remoteui:uiEntry>
 <xoa-s-remoteui:menu>
  <xoa-s-remoteui:id>DeviceConfigurationTemplateAction</xoa-s-remoteui:id>
    <xoa-s-remoteui:extensionPoint>
     RESOURCE.RBTA.ACTIONS_MENU      ~2110
    </xoa-s-remoteui:extensionPoint>
    <xoa-s-remoteui:rank>1</xoa-s-remoteui:rank>
    <xoa-s-remoteui:displayNameKey>
     devicemgm.rbta.configuration.template.action.key   ~2120
    </xoa-s-remoteui:displayNameKey>
   <xoa-s-remoteui:resourceClassName>
     net.xoaframework.devicemanagement.types.IDevice
   </xoa-s-remoteui:resourceClassName>
     <xoa-s-remoteui:foreignResourceClassName>
 com.samsung.solution.app.devicemgt.central.localapi.configuration.model.Device
 ConfigurationTemplate
     </xoa-s-remoteui:foreignResourceClassName>
 </xoa-s-remoteui:menu>
</xoa-s-remoteui:uiEntry>
```

```
<xoa-s-remoteui:uiEntry>
 <xoa-s-remoteui:perspective>
  <xoa-s-remoteui:id>
    DeviceConfigurationTemplateAction
  </xoa-s-remoteui:id>
  <xoa-s-remoteui:extensionPoint>
    RESOURCE.RBTA.ACTIONS_MENU.DeviceConfigurationTemplateAction
  </xoa-s-remoteui:extensionPoint>
  <xoa-s-remoteui:rank>1</xoa-s-remoteui:rank>
  <xoa-s-remoteui:displayNameKey>
    devicemgm.rbta.configuration.template.action.key
  </xoa-s-remoteui:displayNameKey>
  <xoa-s-remoteui:resourceClassName>
    net.xoaframework.devicemanagement.types.IDevice
  </xoa-s-remoteui:resourceClassName>
  <xoa-s-remoteui:foreignResourceClassName>
com.samsung.solution.app.devicemgt.central.localapi.configuration.model.Device
ConfigurationTemplate
  </xoa-s-remoteui:foreignResourceClassName>
  <xoa-s-remoteui:layout>
     <xoa-s-remoteui:basicLayout>
     <xoa-s-remoteui:mainView>
     <xoa-s-remoteui:uri>
/app.devicemgt.central.web/client/AppDeviceMgtCentral_configuration
TemplateRbtaAction.swf
     </xoa-s-remoteui:uri>
     </xoa-s-remoteui:mainView>
     </xoa-s-remoteui:basicLayout>
  </xoa-s-remoteui:layout>
 </xoa-s-remoteui:perspective>
</xoa-s-remoteui:uiEntry>
```

MANAGEMENT SERVER, IMAGE FORMING APPARATUS, METHOD FOR INSTALLING OSGI-BASED SERVICE, AND COMPUTER-READABLE RECORDING MEDIUM

CROSS-REFERENCE TO RELATED APPLICATIONS

This application claims the benefit of Korean Patent Application No. 2012-0068167, filed in the Korean Intellectual Property Office on Jun. 25, 2012, the content of which is incorporated herein by reference in its entirety.

BACKGROUND OF THE INVENTION

1. Field of the Invention

The present general inventive concept relates to a management server, an image forming apparatus, a method of installing an Open Service Gateway initiative (OSGi)-based service, and a computer-readable recording medium, and more particularly, to a management server capable of providing new services using functions provided by bundles which are pre-installed in an OSGi framework, an image forming apparatus, and a method of installing OSGi-based services, and a computer-readable recording medium.

2. Description of the Related Art

As digital technologies and Internet services have been distributed rapidly, a digital home technology which provides services that can help users in their everyday lives using all those digital technologies and Internet services has been established. The digital home technology aims to go beyond the concept of the home networking service which has been developed previously for sharing super-speed Internet sharing, file sharing and sharing of peripheral apparatuses, in order to provide more various functions utilizing well-established external communication infrastructure.

The representative service platform of such a digital home technology is an Open Service Gateway initiative (OSGi) service platform which is designed to operate based on JAVA virtual machine. OSGi provides basic services on a framework, such as HTTP, service management, log service, etc., and service provides may provide services by distributing their services to the OSGi framework in the form of bundle. In particular, OSGi supports the existing home network technologies such as UPnP, Jini, HAVi, etc., and thus, may be applicable to various environments such as a television set-top box, a cable modem, an alarm system, an energy management system, and so on.

The bundle used in OSGi may be used by exporting or importing them from each other. Accordingly, extension, re-usability, and re-combination among bundles have been possible based on such flexibility of the bundles.

Conventionally, interlocking of bundles has been possible only by re-using interface between bundles through extension and linkage of functions, and it has not been possible for users to set, connect, store, or modify the existing functions directly from the perspective of the users, in order to be provided with new services.

SUMMARY OF THE INVENTION

The present general inventive concept provides a management server capable of providing new services using functions provided by bundles which are pre-installed in an OSGi framework, an image forming apparatus, and a method of installing OSGi-based services, and a computer-readable recording medium thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a management server providing an Open Service Gateway initiative (OSGi)-based service, the management server comprising a user interface unit to receive UI information to provide a new service and a selection of a plurality of functions to perform the new service, a generation unit to generate a virtual bundle including information of a bundle pre-installed in an OSGi framework corresponding to the selected plurality of functions, and an installation unit to install the generated virtual bundle in the OSGi framework.

The user interface unit may display functions of each of a plurality of bundles pre-installed in the OSGi framework, and receive a selection of a plurality of functions to perform a new service from among the displayed functions.

The user interface unit may display functions of each of a plurality of bundles pre-installed in the OSGi framework distinctively by dividing the functions into three classes.

The three classes may include functions to be performed in the management server in case a selected first condition corresponding to a possible event in the management server, and a selected second condition corresponding to an event corresponding to the first condition, are both satisfied.

The UI information may be information regarding an image of a new user interface window or information regarding a user interface window provided by a pre-installed bundle.

The information of a bundle pre-installed in an OSGi framework may be written in eXtensible Markup Language (XML).

The management server may further include a control unit to perform a plurality of functions using a service engine of bundles corresponding to each of the plurality functions to perform the new service when a request to execute the new service is received.

The control unit may control the user interface unit to display a result of executing the plurality of functions based on the input UI information.

The management server may be connected to an image forming apparatus, and manages at least one of a function of the connected image forming apparatus, charging, and security setting.

The foregoing and/or other features and utilities of the present general inventive concept may also be achieved by providing an image forming apparatus providing an Open Service Gateway initiative (OSGi)-based service, the image forming apparatus comprising a user interface unit to receive UI information to provide a new service and a selection of a plurality of functions to perform the new service, a generation unit to generate a virtual bundle including information of a bundle pre-installed in an OSGi framework corresponding to the selected plurality of functions, and an installation unit to install the generated virtual bundle in the OSGi framework.

The foregoing and/or other features and utilities of the present general inventive concept may also be achieved by providing a method of installing an Open Service Gateway initiative (OSGi)-based service, the method comprising receiving UI information to provide a new service and a selection of a plurality of functions to perform the new service, generating a virtual bundle including information of a bundle pre-installed in an OSGi framework corresponding to the selected plurality of functions, and installing the generated virtual bundle in the OSGi framework.

The receiving a plurality of functions may include displaying functions of each of a plurality of bundles pre-installed in the OSGi framework, and receiving a selection of a plurality of functions to perform a new service from among the displayed functions.

The displaying functions may include displaying functions of each of a plurality of bundles pre-installed in the OSGi framework distinctively by dividing the functions into three classes.

The three classes may include functions to be performed in the management server in case a selected first condition corresponding to a possible event in the management server, and a selected second condition corresponding to an event corresponding to the first condition, are both satisfied.

The UI information may be information regarding an image of a new user interface window or information regarding a user interface window provided by a pre-installed bundle.

The information of a bundle pre-installed in an OSGi framework may be written in eXtensible Markup Language (XML).

The method may further include performing a plurality of functions using a service engine of bundles corresponding to each of the plurality functions to perform the new service when a request to execute the new service is received.

The method may further include displaying a result of executing the plurality of functions based on the input UI information.

The OSGi framework may be an OSGi framework of an image forming apparatus or an OSGi framework of a management server which is connected to the image forming apparatus.

The foregoing and/or other features and utilities of the present general inventive concept may also be achieved by providing a computer readable recording medium including a program to perform a method of installing an OSGi-based service, the method of installing an OSGi-based service comprises receiving UI information to provide a new service and a selection of a plurality of functions to perform the new service, generating a virtual bundle including information of a bundle pre-installed in an OSGi framework corresponding to the selected plurality of functions, and installing the generated virtual bundle in the OSGi framework.

The foregoing and/or other features and utilities of the present general inventive concept may also be achieved by providing a management server including: a user interface unit to receive a selection of a plurality of functions of bundles pre-installed in an Open Service Gateway initiative (OSGi) framework to perform a new service and a selection of UI information to provide the new service; a generation unit generate a virtual bundle including information corresponding to the selected plurality of functions and the selected UI information; and an installation unit to install the virtual bundle in the OSGi framework.

The management server may further include a communication interface unit to transmit a bundle received from an external server, or the generated virtual bundle, to an image forming apparatus. The management server and the image forming apparatus may be connected to the external server.

The communication interface unit of the management server may transmit the received bundle, or the generated virtual bundle, to a plurality of image forming apparatuses.

The plurality of image forming apparatuses may be connected to the external server through the management server.

The foregoing and/or other features and utilities of the present general inventive concept may also be achieved by providing an image forming apparatus including: a user interface unit to receive a selection of a plurality of functions of bundles pre-installed in an Open Service Gateway initiative (OSGi) framework to perform a new service and a selection of UI information to provide the new service; a generation unit to generate a virtual bundle including information corresponding to the selected plurality of functions and the selected UI information; and an installation unit to install the virtual bundle in the OSGi framework.

The foregoing and/or other features and utilities of the present general inventive concept may also be achieved by providing a method of installing an Open Service Gateway initiative (OSGi)-based service, the method including receiving a selection of a plurality of functions of bundles pre-installed in an OSGi framework to perform a new service and a selection of UI information to provide the new service; generating a virtual bundle including information corresponding to the selected plurality of functions and the selected UI information; and installing the virtual bundle on the OSGi framework.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 20 to 22 are views illustrating a file structure of a bundle according to an exemplary embodiment of the present general inventive concept;

DETAILED DESCRIPTION OF THE PREFERRED EMBODIMENTS

Figure 1:
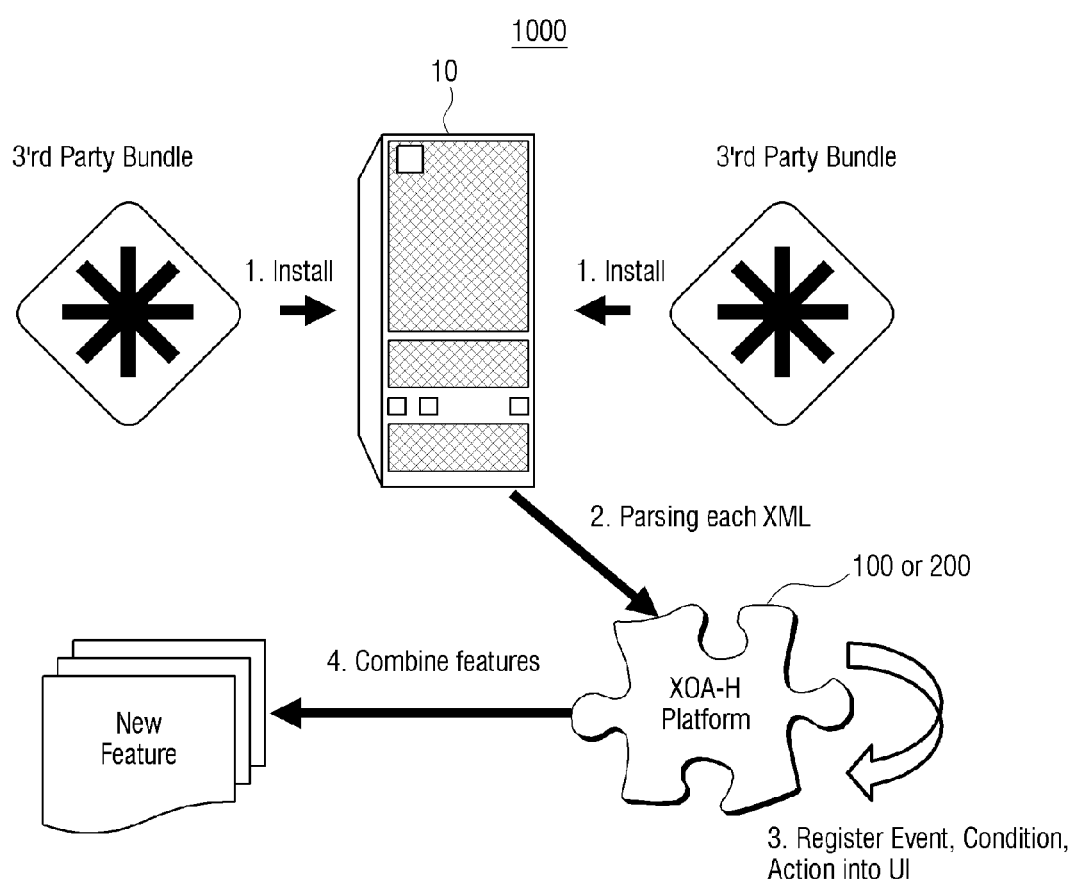
FIG. 1 is a view illustrating the configuration of an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating configuration of an image forming system according to an exemplary embodiment of the present general inventive concept.

Referring to FIG. 1, an image forming system 1000 comprises an external server 10 and an image forming apparatus 200.

The external server 10 is an apparatus capable of providing a bundle to a management server 100 or an image forming apparatus 200, and may be realized not only as a server but also as a PC, a Personal Digital Assistance (PDA), a mobile phone, a digital camera, a digital video camera, a POS terminal, and so on.

Herein, the bundle refers to a program which service provides to distribute their new services. The specific operation of the bundle will be explained later with reference to FIG. 4.

The services represent various functions which are provided by an OSGi-based apparatus. For example, if an OSGi-based apparatus is an image forming apparatus, the services may represent various functions provided by a general image forming apparatus such as fax machine, a copier, and a printer. The services may also refer to functions or services which are not normally provided by the prior art image forming apparatus but are supported as a bundle installed, such as functions or services to transmit a fax document to a specific mail. If an OSGi-based apparatus is a server, the services represent various functions provided by a general management server, such as security management to manage connected image forming apparatuses, job counting, and so on. The services may refer to functions as described above and also, they may refer to combination between functions.

The management server 100 may receive a bundle from the external server 10 and install the received bundle in an OSGi framework. The management server 100 may receive selection of a plurality of functions and UI information to perform new services from a user (or manager), generate a virtual bundle based on the plurality of selected functions and UI information, and install the bundle on the OSGi framework. The specific configuration and function of the management server 100 will be explained later with reference to FIG. 2. The management server 100 may be connected to the image forming apparatus 200 and may be a solution server capable of managing functions of the connected image forming apparatus 200, charging, and securing setting. Meanwhile, in the exemplary embodiment of the present general inventive concept, only the functions of managing functions of the connected image forming apparatus 200, charging, and securing setting are described, but the management server may perform other management functions provided by a general solution server.

The image forming apparatus 200 may receive a bundle from the external server 10 and install the received bundle in an OSGi framework. The examples of such an image forming apparatus include a copier, a printer, fax machine, a Multi Function Peripheral (MFP) combining the functions of the above apparatuses in a single apparatus, and so on. The specific configuration and function of the image forming apparatus 200 will be explained later with reference to FIG. 3.

In FIG. 1, the management server 100 and the image forming apparatus 200 are shown as being connected together to the external server 10. That is, the image forming apparatus 200 may be directly connected to the external server 10. However, in an alternate embodiment of the present general inventive concept, the image forming apparatus 200 may be connected to the external server 10 through the management server 100. In addition, in FIG. 1, the external server 10 is configured as a different component from the management server 100, but the management server 100 may be configured to perform the function of the external server 10 as well.

Figure 2:
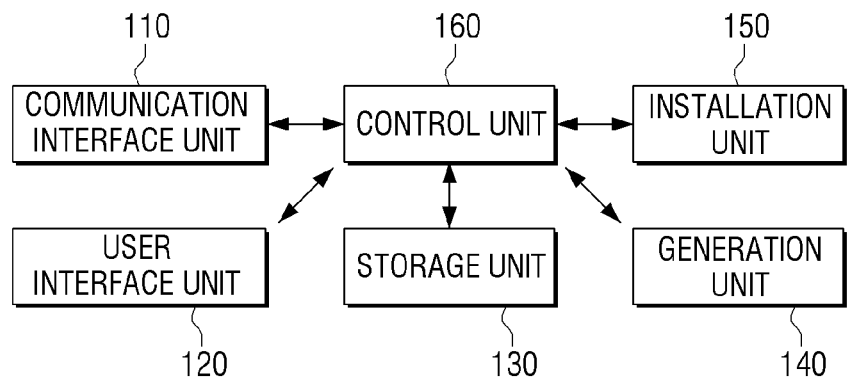
FIG. 2 is a block diagram illustrating the configuration of the management server in FIG. 1 in more detail.

FIG. 2 is a block diagram illustrating the configuration of the management server in FIG. 1 in more detail.

Referring to FIG. 2, the management server 100 may comprise a communication interface unit 110, a user interface unit 120, a storage unit 130, a generation unit 140, an installation unit 150, and a control unit 160.

The communication interface unit 110 may connect the management server 100 to an external apparatus (such as, the external server 10 or the image forming apparatus 200), and the communication interface unit 110 may be connected not only through a Local Area Network (LAN) and Internet network, but also through a Universal Serial Bus (USB) port and a wireless module.

In addition, the communication interface unit 110 may receive information from the image forming apparatus 200. Specifically, the communication interface unit 110 may receive information to manage the image forming apparatus 200 (for example, operation status information, apparatus information of the corresponding apparatus, etc.) from the image forming apparatus 200.

The communication interface unit 110 may transmit a new bundle to the image forming apparatus 200. Specifically, the communication interface unit 110 may transmit a new bundle received from the external server 10 or a virtual bundle generated from the generation unit 140, which will be explained later, to the image forming apparatus 200.

The communication interface unit 110 may transmit a service execution command to the image forming apparatus 200. Specifically, the communication interface unit 110 may transmit a service execution command to the image forming apparatus 200 to perform a service to manage the image forming apparatus connected to the communication interface unit 110 (for example, a command to notify status information, a command to notify job accounting information, a command to change security status, etc.).

The communication interface unit 110 may receive the result of service execution according to the transmitted service execution command from the image forming apparatus 200.

The user interface unit 120 includes a plurality of function keys which allow a user to set or select various functions supported by the management server 100, and may display various information provided by the management server 100. The user interface unit 120 may be realized not only as an apparatus capable of realizing input and output simultaneously, such as a touch screen, but also as an apparatus which combines the functions of a mouse and a monitor.

A user may receive selection of UI information to provide a new service and a plurality of functions to perform a new service through a user interface window provided by the user interface unit 120. Specifically, the user interface unit 120 may display each function of a plurality of bundles pre-installed in an OSGi framework and receive selection of a plurality of functions to perform a new service from among displayed functions. In this case, the user interface unit may display each function of a plurality of bundles pre-installed in an OSGi framework distinctively by dividing them into three categories. Herein, the UI information may be a new user interface window image, and may be UI information of a bundle pre-installed in an OSGi framework (that is, information regarding a UI of which bundle to be used, and in case of displaying specific information, where to display the corresponding UI, etc.).

Herein, the three categories may consist of a first condition, a second condition, and functions. In this case, a user may select the first condition, the second condition, and functions to generate a new service through a user interface window provided by the user interface unit 120. Herein, the first condition is an event which may occur in the management server 100, the second condition is a condition to filter an event corresponding to the first condition, and the functions represent functions which can be performed by the management server 100. The user interface window provided by the user interface unit 120 will be explained later with reference to FIGS. 12 to 18.

The user interface unit 120 may display the result of service execution corresponding to a user's service execution command or a new service generated by a user.

The storage unit 130 stores bundles. The storage unit 130 may store virtual bundles generated by the generation unit 140, which will be explained later.

The storage unit 130 may store event information, filtering information, and function information. Herein, the event information represents information regarding an event which may occur in a management server, and may include a condition where an event occurs, information regarding a bundle which performs occurrence of an event, and so on. The filtering condition information represents filtering information necessary to perform filtering if an event corresponding to the first condition occurs, and may include information regarding filtering conditions, bundles to determine filtering, and so on. The function information represents information regarding functions which can be performed by a management server, and may include information regarding titles of functions that can be performed, bundles to perform corresponding functions, and so on.

The storage unit 130 may store management information. Specifically, the storage unit 130 may store information received from the image forming apparatus 200 through the communication interface unit 110 as management information. Herein, the management information may be a security setting in the image forming apparatus 200, and may be charging information based on printing history of the image forming apparatus 200 (or charging information for each user). That is, the management server 100, according to an exemplary embodiment of the present general inventive concept, may be a solution server capable of performing a charging function and a managing function, regarding an image forming apparatus, and information necessary to perform the corresponding functions may be stored in the storage unit 130.

The storage unit 130 may be a memory mounted inside the management server 100, for example, a ROM, a flash memory, and a HDD, and may also be an external HDD or a memory card connected to the management server 100, for example, a flash memory (M/S, xD, SD, etc.) or a USB memory.

The generation unit 140 may generate virtual bundles. Specifically, the generation unit 140 may generate virtual bundles including UI information to provide a new service selected through the user interface unit 120 and a plurality of functions to perform a new service. For example, if the first condition, the second condition, and functions are selected through a user interface window, the generation unit 140 may generate a string command corresponding to the first condition, the second condition, and the functions selected through the user interface unit 120, and generate virtual bundles including connection information regarding bundles corresponding to the first condition, connection information regarding bundles corresponding to the second condition, and connection information regarding bundles corresponding to the functions using the generated string command. The specific operation of generating virtual bundles will be explained later with reference to FIGS. 19 to 22.

The installation unit 150 may install bundles in an OSGi framework. Specifically, the installation unit 150 may install virtual bundles generated by the generation unit 140, or new bundles received through the communication interface unit 110 in an OSGi framework.

The control unit 160 may control each component inside the management server 100. Specifically, if a command to generate a new service is received from a user, the control unit 160 may control the user interface unit 120 to display a user interface window to select UI information and a plurality of functions. For example, if a new service is generated based on a regulation, according to an exemplary embodiment of the present general inventive concept, the control unit 160 may control the user interface unit 120 to display a user interface window to select the first condition, the second condition, and functions.

If UI information and a plurality of functions are received through the user interface unit 120, the control unit 160 may control the generation unit 140 to generate virtual bundles including the selected UI information and the selected plurality of functions and control the installation unit 150 to install the generated virtual bundles in an OSGi framework. For example, if a new service is generated based on a regulation, according to an exemplary embodiment of the present general inventive concept, the control unit 160 may control the generation unit 140 to generate virtual bundles including 'information for connection with bundles' corresponding to each of the selected first condition, second condition, and functions and virtual bundles including UI information, and control the installation unit 150 to install the generated virtual bundles in an OSGi framework.

The control unit 160 may provide a newly-set service. Specifically, the control unit 160 may perform a plurality of functions using a service engine of a bundle corresponding to each of a plurality of functions to perform the new service, and control the user interface unit 120 to display the performance result based on the UI information included in virtual bundles. For example, if a new service is generated based on a regulation, according to an exemplary embodiment, the control unit 160 may sense whether an event corresponding to the first condition occurs using a service engine of a bundle corresponding to the first condition. If an event corresponding to the first condition occurs, the control unit 160 may sense whether it is a status corresponding to the second condition using a service engine of a bundle corresponding to the second condition. If the first condition and the second condition are satisfied, the corresponding services may be performed using a service engine of a bundle regarding the functions corresponding to the first condition and the second condition.

Figure 25:
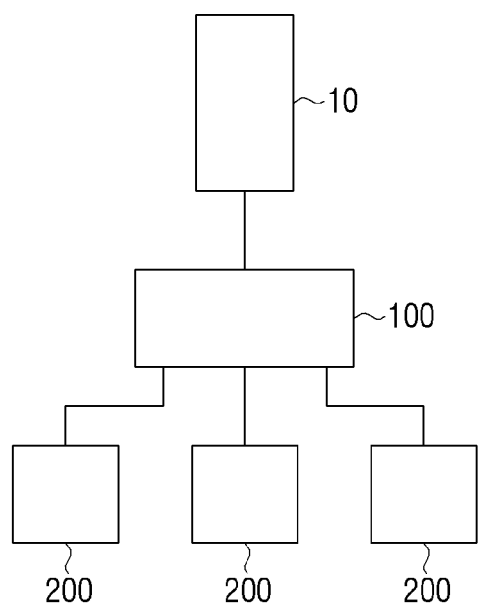
FIG. 25 is a view illustrating an alternate configuration of an image forming system according to an exemplary embodiment of the present general inventive concept.

The control unit 160 may manage the connected image forming apparatus 200 in accordance with management information stored in the storage unit 130 and/or management information received through the communication interface unit 110. Specifically, if the connected image forming apparatus 200 includes an option and a setting which violate a preset security policy, the control unit 160 may control the communication interface unit 110 to transmit a control command for correction to the corresponding image forming apparatus. In an exemplary embodiment of the present general inventive concept, the management server 100 may connect a plurality of image forming apparatuses 200 to the external server 10, as shown in FIG. 25. In addition, the control unit 160 may control each image forming apparatus 200 to perform a printing operation based on a preset charging setting in each image forming apparatus.

As described above, the management server 100, according to an exemplary embodiment of the present general inventive concept, may provide a new service by combining functions of pre-installed bundles, and thus user convenience may be enhanced. In addition, as functions of pre-installed bundles are re-used, quality can be guaranteed, and the time to develop a new service may be reduced by re-using function units and generating only a UI.

Meanwhile, in the above description regarding FIG. 2, the generation unit 140, the installation unit 150, and the control unit 160 are illustrated as separate components, but the functions of the generation unit 140, the functions of the installation unit 150, and the functions of the control unit 160 may be realized through a single component.

Figure 3:
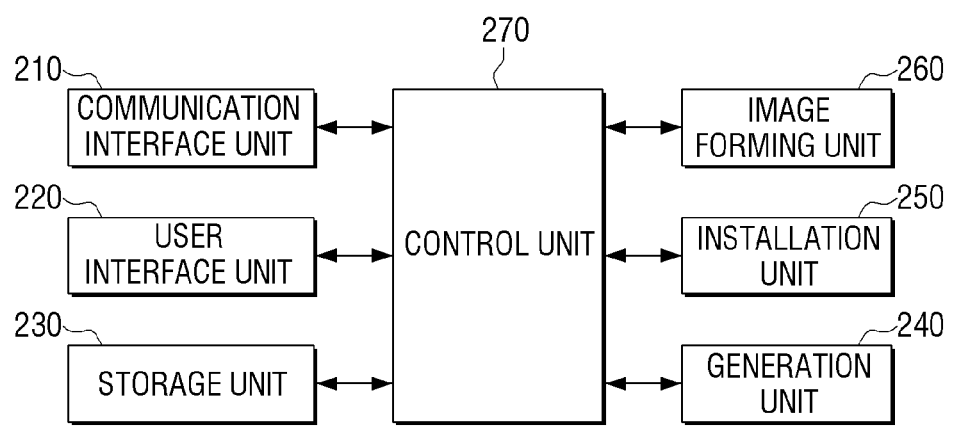
FIG. 3 is a block diagram illustrating the configuration of the image forming apparatus in FIG. 1 in more detail.

FIG. 3 is a block diagram illustrating the configuration of the image forming apparatus in FIG. 1 in more detail.

Referring to FIG. 3, the image forming apparatus 200 may comprise a communication interface unit 210, a user interface unit 220, a storage unit 230, a generation unit 240, an installation unit 250, an image forming unit 260, and a control unit 270.

The communication interface unit 210 may connect the image forming apparatus 200 to an external apparatus (such as, the external server 10 or the management server 100), and the communication interface unit 210 may be connected not only through a Local Area Network (LAN) and Internet network, but also through a Universal Serial Bus (USB) port and a wireless module.

In addition, the communication interface unit 210 may transmit a service execution result according to transmitted service commands and information to the management server 100. Specifically, the communication interface unit 210 may transmit information to the management server 100 necessary to manage the image forming apparatus 200 (for example, operation status information, apparatus information of the corresponding apparatus, etc.) in response to a request from the management server 100 or at a predetermined time.

The communication interface unit 210 may receive a new bundle. Specifically, the communication interface unit 210 may receive a new bundle from the external server or the management server 100.

The user interface unit 220 may include a plurality of function keys to allow a user to set or select various functions supported by the image forming apparatus 200, and may display various information provided by the image forming apparatus 200. The user interface unit 220 may be realized not only as an apparatus capable of realizing input and output simultaneously, such as a touch screen, but also as an apparatus which combines the functions of a mouse and a monitor.

A user may receive selection of UI information to provide a new service and a plurality of functions to perform a new service through a user interface window provided by the user interface unit 220. Specifically, the user interface unit 220 may display each function of a plurality of bundles pre-installed in an OSGi framework and receive selection of a plurality of functions to perform a new service from among displayed functions. In this case, the user interface unit 220 may display each function of a plurality of bundles pre-installed in an OSGi framework distinctively by dividing them into three categories. Herein, the UI information may be a new user interface window image, and may be UI information of a bundle pre-installed in an OSGi framework (that is, information regarding a UI of which bundle to be used, and in case of displaying specific information, where to display the corresponding UI, etc.).

Herein, the three categories may consist of the first condition, the second condition, and functions. In this case, a user may select the first condition, the second condition, and functions to generate a new service through a user interface window provided by the user interface unit 220. Herein, the first condition is an event which may occur in the image forming apparatus 200, the second condition is a condition to filter an event corresponding to the first condition, and the functions represent functions which can be performed by the image forming apparatus 200. The user interface window provided by the user interface unit 220 will be explained later with reference to FIGS. 12 to 18

The user interface unit 220 may display the result of service execution corresponding to a user's service execution command or a new service generated by a user.

The storage unit 230 stores bundles. The storage unit 230 may store virtual bundles generated by the generation unit 240 which will be explained later.

The storage unit 230 may store event information, filtering information, and function information. Herein, the event information represents information regarding an event which may occur in the image forming apparatus 200, and may include a condition where an event occurs, information regarding a bundle which performs occurrence of an event, and so on. The filtering condition information represents filtering information necessary to perform filtering when an event corresponding to the first condition occurs, and may include information regarding filtering conditions, bundles to determine filtering, and so on. The function information represents information regarding functions which can be performed by the image forming apparatus, and may include information regarding titles of functions that can be performed, bundles to perform corresponding functions, and so on.

The storage unit 230 may be a memory mounted inside the image forming apparatus 200, for example, a ROM, a flash memory, and a HDD, and may also be an external HDD or a memory card connected to the image forming apparatus 200, for example, a flash memory (M/S, xD, SD, etc.) or a USB memory.

The generation unit 240 may generate virtual bundles. Specifically, the generation unit 240 may generate a string command corresponding to the selected first condition, the second condition, and the functions, and generate virtual bundles including connection information regarding bundles corresponding to the first condition, connection information regarding bundles corresponding to the second condition, and connection information regarding bundles corresponding to the functions using the generated string command. The specific operation of generating virtual bundles will be explained later with reference to FIGS. 19 to 22.

The generation unit 240 may generate virtual bundles. Specifically, the generation unit 240 may generate virtual bundles including UI information to provide a new service selected through the user interface unit 220 and a plurality of functions to perform a new service. For example, if the first condition, the second condition, and functions are selected through a user interface window, the generation unit 240 may generate a string command corresponding to the first condition, the second condition, and the functions selected through the user interface unit 220, and generate virtual bundles including connection information regarding bundles corresponding to the first condition, connection information regarding bundles corresponding to the second condition, and connection information regarding bundles corresponding to the functions using the generated string command. The specific operation of generating virtual bundles will be explained later with reference to FIGS. 19 to 22.

The installation unit 250 may install bundles in an OSGi framework. Specifically, the installation unit 250 may install virtual bundles generated by the generation unit 240, or new bundles received through the communication interface unit 210 in an OSGi framework.

The image forming unit 260 may perform a printing operation. Specifically, if a user's service request command is related to a printing service, the image forming unit 260 may perform a printing operation in response to the user's service request. In the exemplary embodiment of the present general inventive concept, the image forming apparatus 200 includes the image forming unit 260 as a function component, but a fax component performing a fax function and a scan component performing scanning of a document may also be included.

The control unit 270 may control each component inside the image forming apparatus 200. Specifically, if a command to generate a new service is received from a user, the control unit 270 may control the user interface unit 220 to display a user interface window to select UI information and a plurality of functions. For example, if a new service is generated based on a regulation, according to an exemplary embodiment of the present general inventive concept, the control unit 270 may control the user interface unit 220 to display a user interface window to select the first condition, the second condition, and functions.

If UI information and a plurality of functions are received through the user interface unit 220, the control unit 270 may control the generation unit 240 to generate virtual bundles including the selected UI information and the selected plurality of functions and control the installation unit 250 to install the generated virtual bundles in an OSGi framework. For example, if a new service is generated based on a regulation, according to an exemplary embodiment of the present general inventive concept, the control unit 270 may control the generation unit 240 to generate virtual bundles including 'information for connection with bundles' corresponding to each of the selected first condition, second condition, and functions and virtual bundles including UI information, and control the installation unit 250 to install the generated virtual bundles in an OSGi framework.

The control unit 270 may provide a newly-set service. Specifically, the control unit 270 may perform a plurality of functions using a service engine of a bundle corresponding to each of a plurality of functions to perform the new service, and control the user interface unit 220 to display the performance result based on the UI information included in virtual bundles. For example, if a new service is generated based on a regulation, according to an exemplary embodiment of the present general inventive concept, the control unit 270 may sense whether an event corresponding to the first condition occurs using a service engine of a bundle corresponding to the first condition. If an event corresponding to the first condition occurs, the control unit 270 may sense a status corresponding to the second condition using a service engine of a bundle corresponding to the second condition. If the first condition and the second condition are satisfied, the control unit 27 may perform the corresponding service using a service engine of a bundle regarding the functions corresponding to the first condition and the second condition.

As described above, the image forming apparatus 200, according to an exemplary embodiment of the present general inventive concept, may provide a new service by combining functions of pre-installed bundles, and thus user convenience may be enhanced. In addition, as functions of pre-installed bundles are re-used, quality can be guaranteed, and the time to develop a new service may be reduced by re-using function units and generating only a UI.

Meanwhile, in the above description regarding FIG. 3, the generation unit 240, the installation unit 250, and the control unit 270 are illustrated as separate components, but the functions of the generation unit 240, the functions of the installation unit 250, and the functions of the control unit 270 may be realized through a single component.

Figure 4:
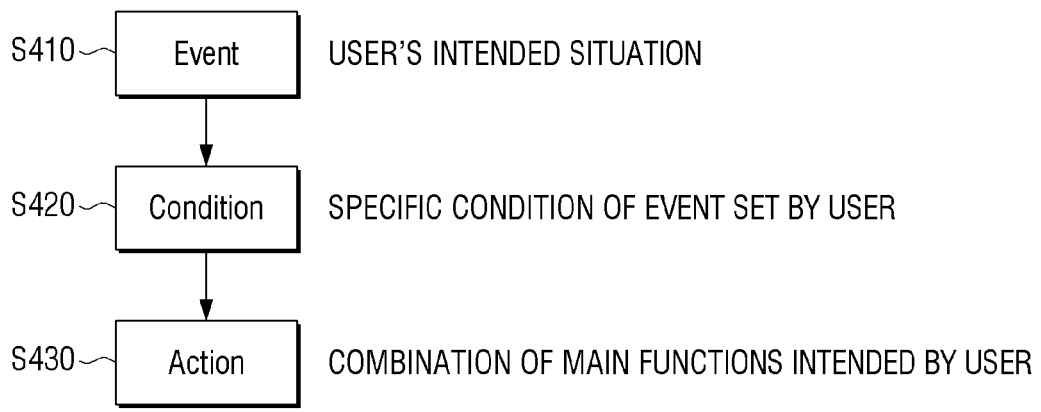
FIG. 4 is a view to explain regulation-based main components according to an exemplary embodiment of the present general inventive concept.

FIG. 4 is a view to explain regulation-based main components according to an exemplary embodiment of the present general inventive concept.

In order to combine functions desired by a user, a system classifies existing main functions into three main components so that a user may directly generate new functions by combining them.

The main components comprise the first condition (or event), the second condition (or condition), and function (or action).

The first condition 410 is a main function from among a plurality of functions, and the first condition 410 declares the main function of a specific event desired by a user, and if the corresponding event occurs, performs the function by checking the second condition which is the sub condition. That is, the first condition 410 is a main category in the upper class from among many events.

The second condition 420 is a specific condition subordinate to the first condition 410. The second condition 420 checks the condition set by the user when a particular event occurs, and notifies the next function when the condition is included. The second condition 420 can combine several conditions. For example, a plurality of specific parallel conditions can be added (i.e., a plurality of specific conditions can be added using OR operation), a plurality of specific serial conditions can be added (i.e., a plurality of specific conditions can be added using AND operation), and a plurality of specific serial/parallel conditions can be added.

The function 430, which is the actual function desired by the user, executes the particular function when the second condition takes place after the first condition takes place. The function 430 can combine several functions. That is, when the first condition and the second condition are satisfied, a plurality of functions can be executed at the same time.

The user can create a new service by easily understanding the given steps in the basic category region like a Wizard function and selecting his/her intended function and condition in each step, which shall be explained by referring to FIGS. 12 through 18. The components can be added or deleted based on XML per internal function of the 3'rd party bundle or the In house bundle according to the main function of the OSGi open platform, and can generate the condition per distributed function and the final flow.

Figure 5:
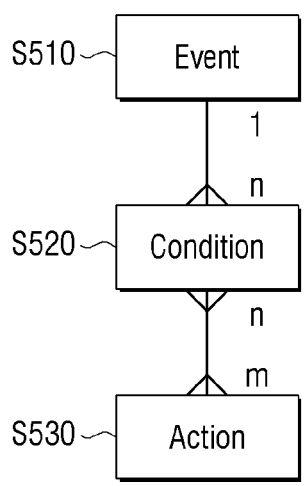
FIGS. 5 and 6 are views illustrating relations between the main components in FIG. 6.
Figure 6:
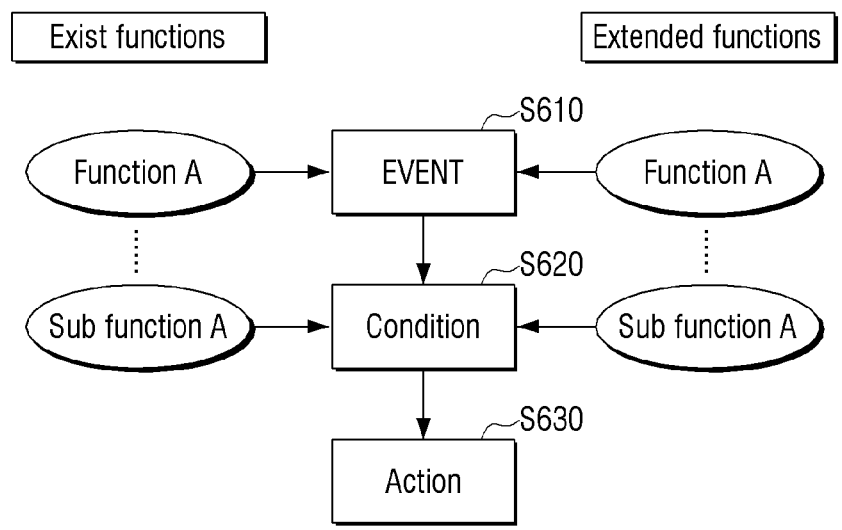

FIGS. 5 and 6 are diagrams illustrating relations between the major components.

Referring to FIGS. 5 and 6, the relations of the first condition S510, S610, the second condition S520, S620, and the function S530, S630 can build 1:n and n:m relationships based on the final functions.

The highest first condition S510, S610 and second condition S520, S620 are in the 1:n relationship and can provide a user-oriented scenario by providing an easy and obvious relation guide for the understanding of the user. As such, the multiple second conditions S520, S620 can be connected to one first condition S510, S610, and the multiple functions S530, S630 can be connected to the second condition S520, S620, to thus generate the rule.

Since the rule-based service according to an embodiment of the present general inventive concept includes the second condition S520, S620, the user can be provided with more conditions and the subdivided functions.

Figure 7:
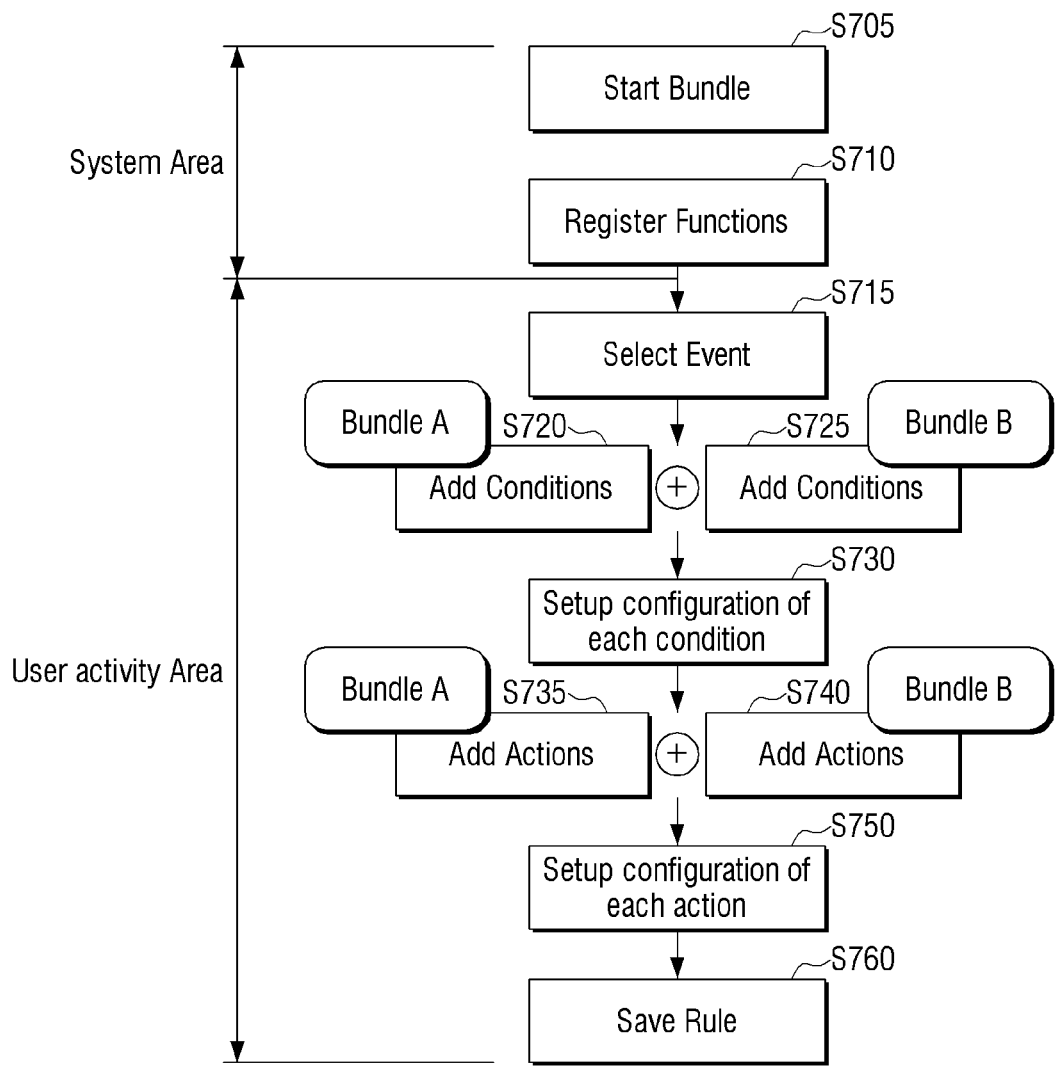
FIG. 7 is a flowchart to explain a method of generating new regulations according to an exemplary embodiment of the present general inventive concept.

FIG. 7 is a flowchart of a method of generating a new rule according to an embodiment of the present general inventive concept.

Referring to FIG. 7, the method can be divided largely into a step of registering the function of each bundle to the OSGi framework and a step for combining and storing the registered functions in view of the user.

The method starts the 3'rd party bundle and the bundle including the main function (S705).

The method registers to the first condition, second condition, and function categories by parsing a file remoteui.xml declared in a folder Meta-INF (S710).

The user can select one of the plurality of the first conditions registered (S715).

The plurality of the specific conditions subordinate to the first condition selected can be displayed and selected through a pop-up of each bundle (S720 and S725). The method sets a specific value required for each specific condition selected (S730).

The function to execute when the first condition and the second condition are satisfied is selected (S735 and S740).

The method sets a specific value required to perform the action (S750), and declares and stores the name and the description of the established rule (S760).

As shown in FIG. 7, the second condition and the function use the service engine of a other bundle.

FIGS. 8 through 11 are diagrams illustrating the new bundle generation according to an embodiment of the present general inventive concept.

Figure 8:
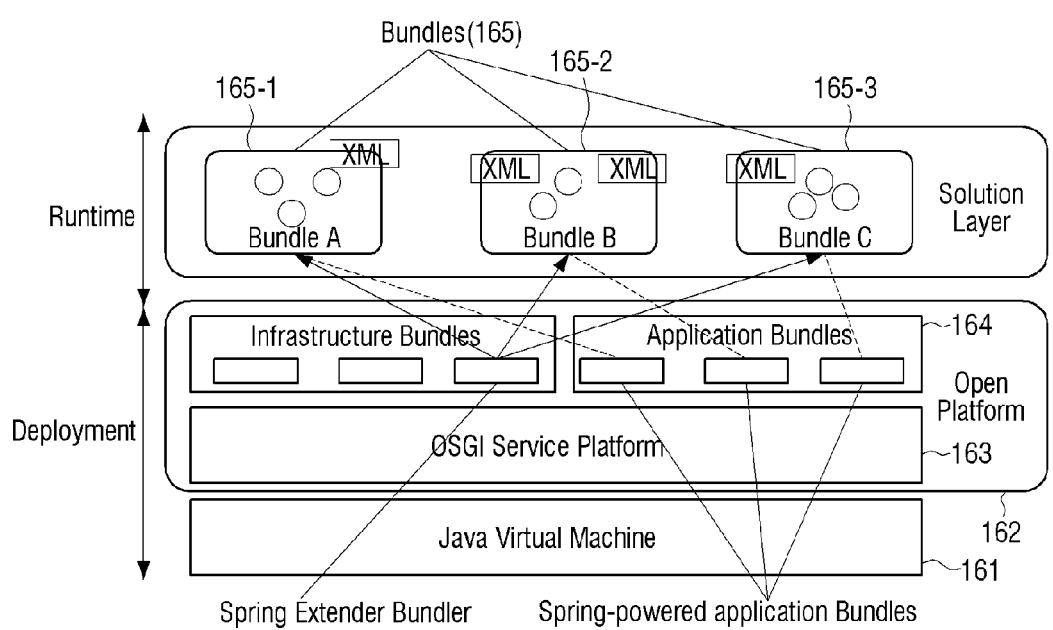
FIGS. 8 to 11 are views to explain a process of generating a new bundle according to an exemplary embodiment of the present general inventive concept.

Specifically, FIG. 8 is a diagram of extendibility based on the server of the main architecture of the server platform in the OSGi technology.

Referring to FIG. 8, the control unit 160 includes a Java virtual machine 161 and an OSGi platform 162.

The OSGi platform 162 operates based on the Java virtual machine 161, and includes an OSGi service platform 163 and a plurality of bundles 164.

The OSGi service platform 163 provides basic services such as HTTP, service management, and log service, and can provide the extended service using the bundles 164 installed on the OSGi service platform.

Connections between the bundles 165-1, 165-2, and 165-3 in the runtime of the upper part in the OSGi open platform (or the OSGi service platform) are defined based on an XML document. Hence, developers can generate and extend the bundle based on the basic SDK, and extend and develop the function of the bundle by referring to the bundles using the open interface of the bundle. The reference information can be described in the XML for the connection.

Using the reference between the bundles, the new bundle, that is, the virtual bundle can be generated by reusing the main function of each bundle.

While the virtual bundle is viewed as a totally new bundle from the user, the developer can generate the virtual bundle by generating only the UI and combining the existing functions.

Figure 9:
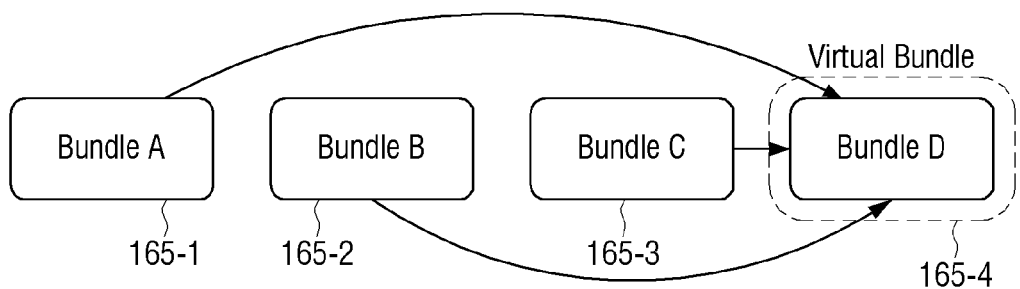

In detail, when the existing bundle or the other bundle includes the specific function required for the new service, the new bundle does not have to realize the same function and can be generated by combining the functions and reconstructing the UI. That is, when the new bundle is necessary, as shown in FIG. 9, the virtual bundle 165-4 can be generated by importing the main functions of the existing bundles A, B, and C 165-1, 165-2 and 165-3.

As such, the virtual bundle 165-4 does not require the business logic and the new bundle can operate by combining the existing main functions. Thus, reliability can be improved by reusing the verified component and the time can be shorted by reusing the software.

Figure 10:
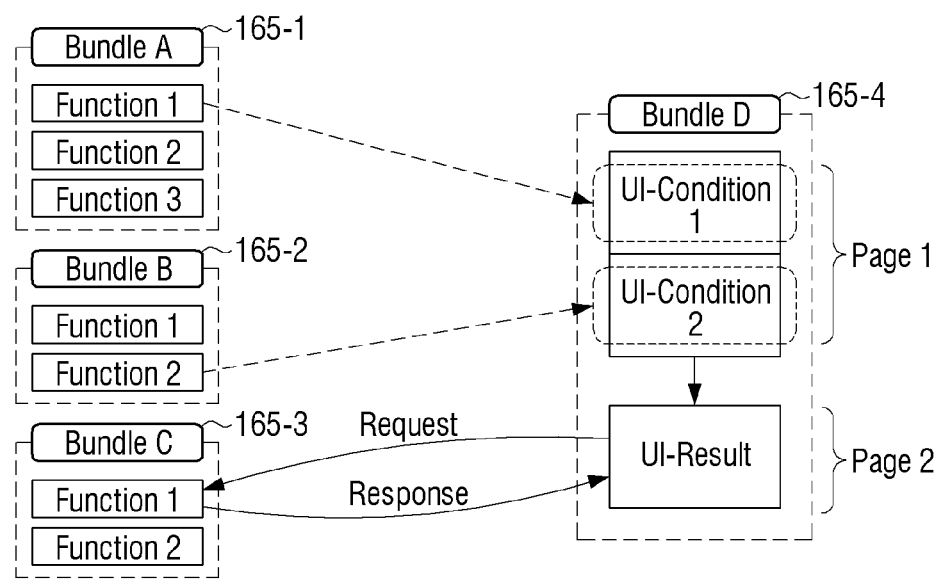

Hereafter, the detailed structure of the virtual bundle is described by referring to FIG. 10.

Referring to FIG. 10, the virtual bundle includes only the UI and is looked like the new function to the user by combing the existing functions on the UI screen.

The virtual bundle can include a page for combining and using various functions with the condition in one UI, and may include only the UI showing one simple result.

The virtual bundle includes two UIs in FIG. 10, and the first UI requests the condition for a particular action. The result is returned from the other bundle and the two bundles A and B 165-1 and 165-2 are combined in one UI screen. When the user selects his/her intended condition and then proceeds to the purpose on the screen, the other bundle C 165-3 performs the operation and the result can be checked in the bundle D 165-4 including the UI showing only the result.

As a result, it looks to the user as if every function is processed in the virtual bundle 165-4, but the virtual bundle does not have the business logic at all. Such function extension can generate the new function within a short time and flexibly extend several services.

Figure 11:
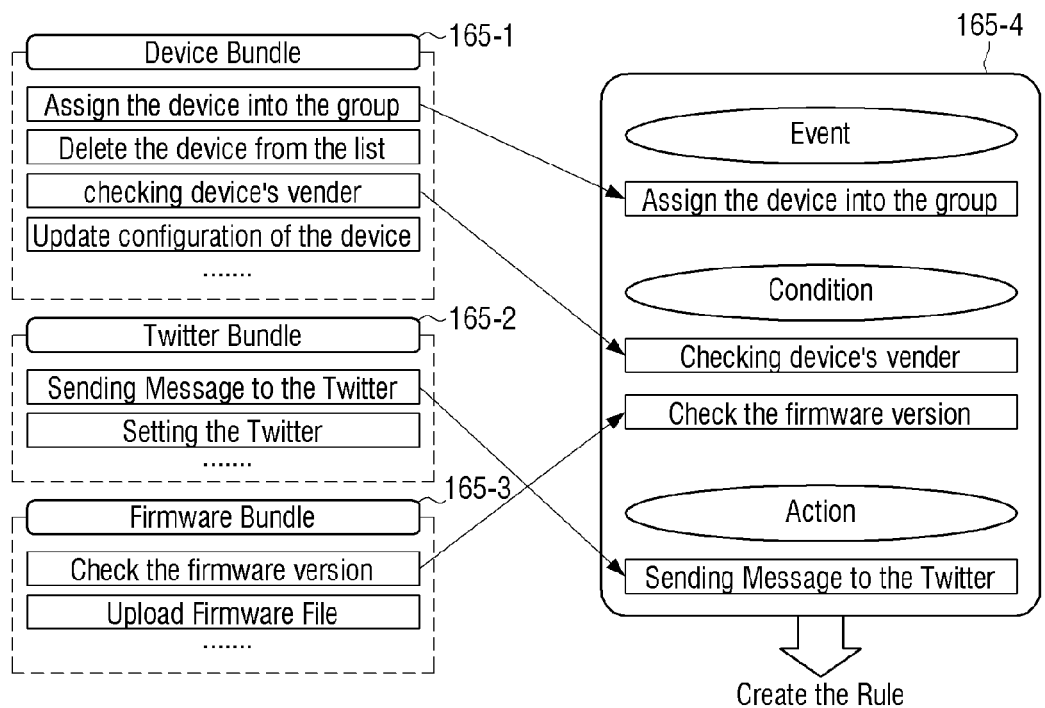

FIG. 11 is a diagram illustrating the structure of the virtual bundle providing the rule-based service according to an embodiment of the present general inventive concept.

Referring to FIG. 11, the virtual bundle 165-4 includes a first condition, two second conditions, and a function. The first condition uses the service engine of the bundle A 165-1, the second conditions use the service engine of the bundle A 165-1 and the service engine of the bundle C 165-3, and the function uses the service engine of the bundle B 165-2. For example, when the image forming apparatus is assigned to a particular group (the first condition) and the corresponding image forming apparatus matches a preset vender and a firmware version (the second condition), this situation can be messaged to the Twitter (the function).

FIGS. 12 through 18 are diagrams illustrating user interface windows used to generate the new rule according to an embodiment of the present general inventive concept.

Figure 12:
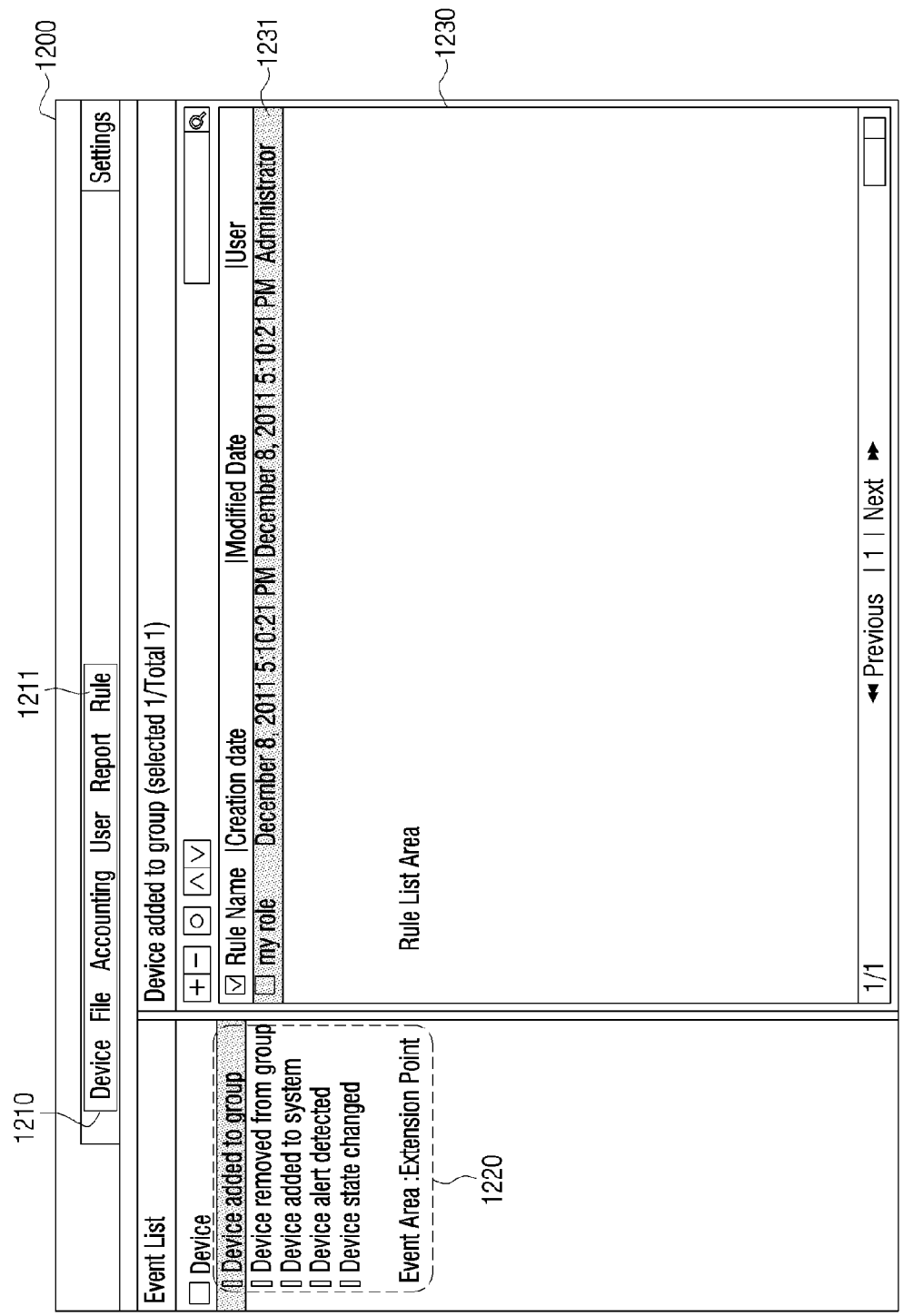
FIGS. 12 to 18 are views illustrating examples of a user interface window used in the process of generating new regulations according to an exemplary embodiment of the present general inventive concept.

Referring to FIG. 12, a user interface unit 1200 includes a first region 1210, a second region 1220, and a third region 1230.

The first region 1210 displays the service category provided by the management server 100 (or the image forming apparatus). When Rule 1211 is selected, the user interface window of FIG. 12 is displayed.

The second region 1220 receives the first condition. In detail, the second region 1220 can display a plurality of events generated in the management server (or the image forming apparatus). Herein, the event can include an event to detect a new image forming apparatus, an event to detect an alert in the image forming apparatus managed by the management server, an event to change the state of the image forming apparatus managed by the management server, an event to add a new image forming apparatus to the management group managed by the management server, and an event to remove the image forming apparatus from the management group managed by the management server, as shown in FIG. 12. When the present general inventive concept is applied to the image forming apparatus, an event other than the events in the above examples can also be used as the first condition.

Figure 13:
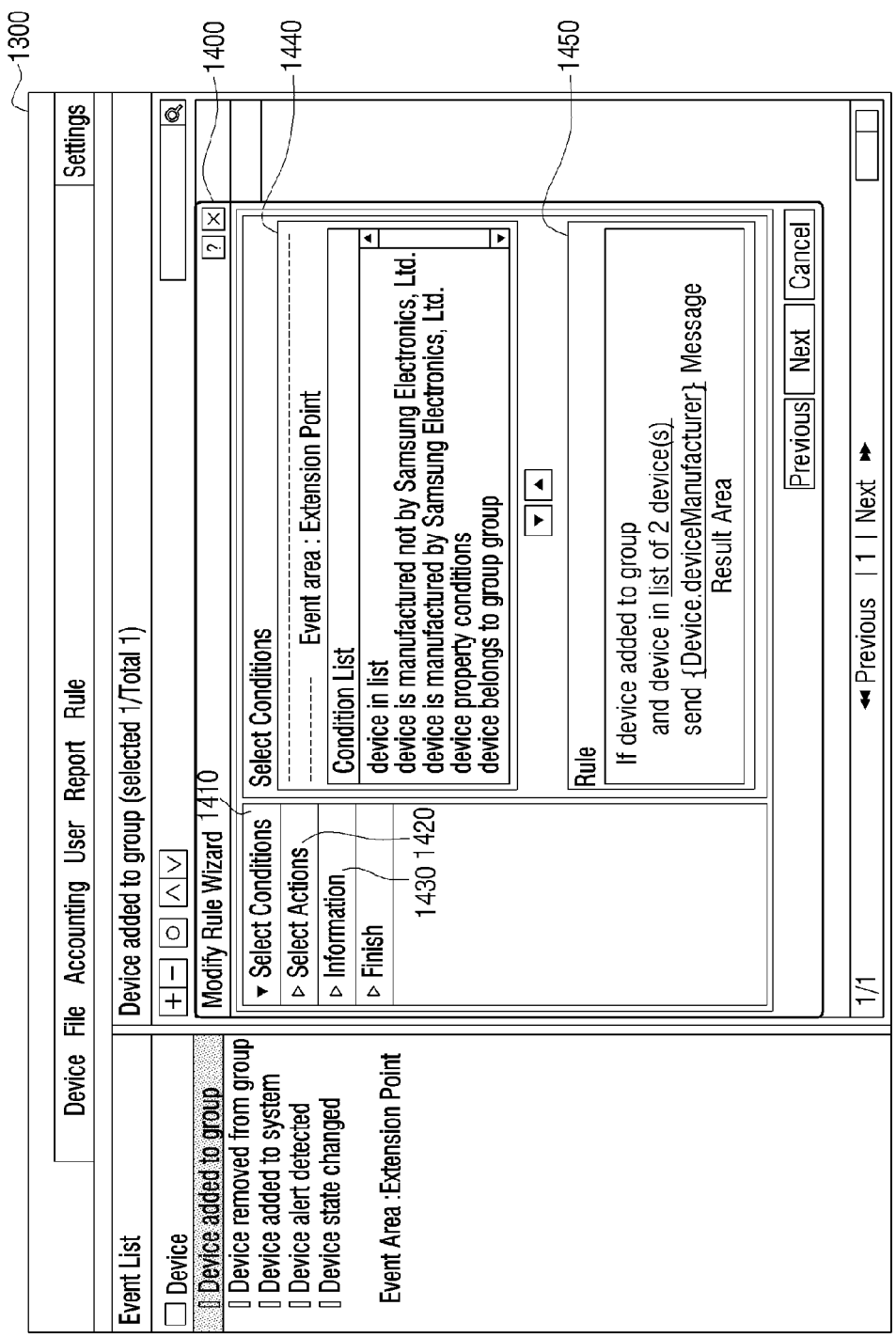

When one of the events is selected in the second region 1220, the user interface unit 1300 comprising the user interface window 1400 of FIG. 13 can be displayed.

As shown in FIG. 13, the third region 1230 of FIG. 12 displays the pre-generated new service. The new service 1231 of FIG. 12 may be generated as shown in FIG. 13.

Referring to FIG. 13, the user interface window 1400 includes division regions 1410, 1420, and 1430, a region 1440 to select the second condition or the function, and a region 1450 to display the string command.

The division regions 1410, 1420, and 1430 change the item to be input on the region 1440 to select the second condition or the function. In FIG. 13, the region for selecting the second condition is displayed.

The region 1440 to select the second condition inputs the second condition. In detail, the region 1440 to select the second condition can display a plurality of filtering conditions corresponding to the event corresponding to the first condition selected, and select at least one of the filtering conditions. When the user selects the second condition in the displayed region, the string command corresponding to the selected first condition, the second condition, and the function may be displayed in the region 1450 to display the string command.

Figure 14:
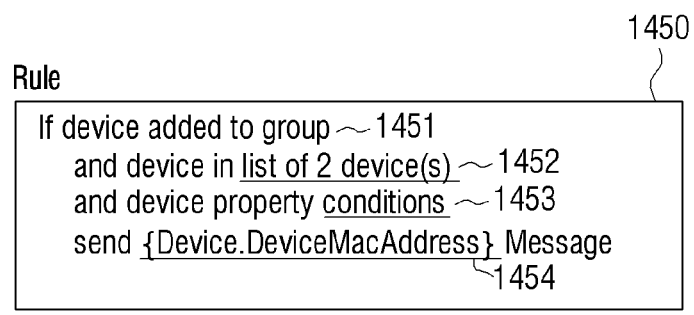

The region 1450 to display the string command is described by referring to FIG. 14.

Referring to FIG. 14, the region 1450 to display the string command includes a region 1451 displaying the selected first condition, regions 1452 and 1453 displaying the selected second condition, and a region 1454 displaying the selected function.

In the region 1450 to display the string command, the user can easily perceive the rule of the new service being generated.

Referring to FIG. 14, the region 1453 displaying the selected second condition does not record specific conditions. Hence, when the user selects the region 1453 displaying the second condition, the user interface window of FIG. 15 is displayed.

Figure 15:
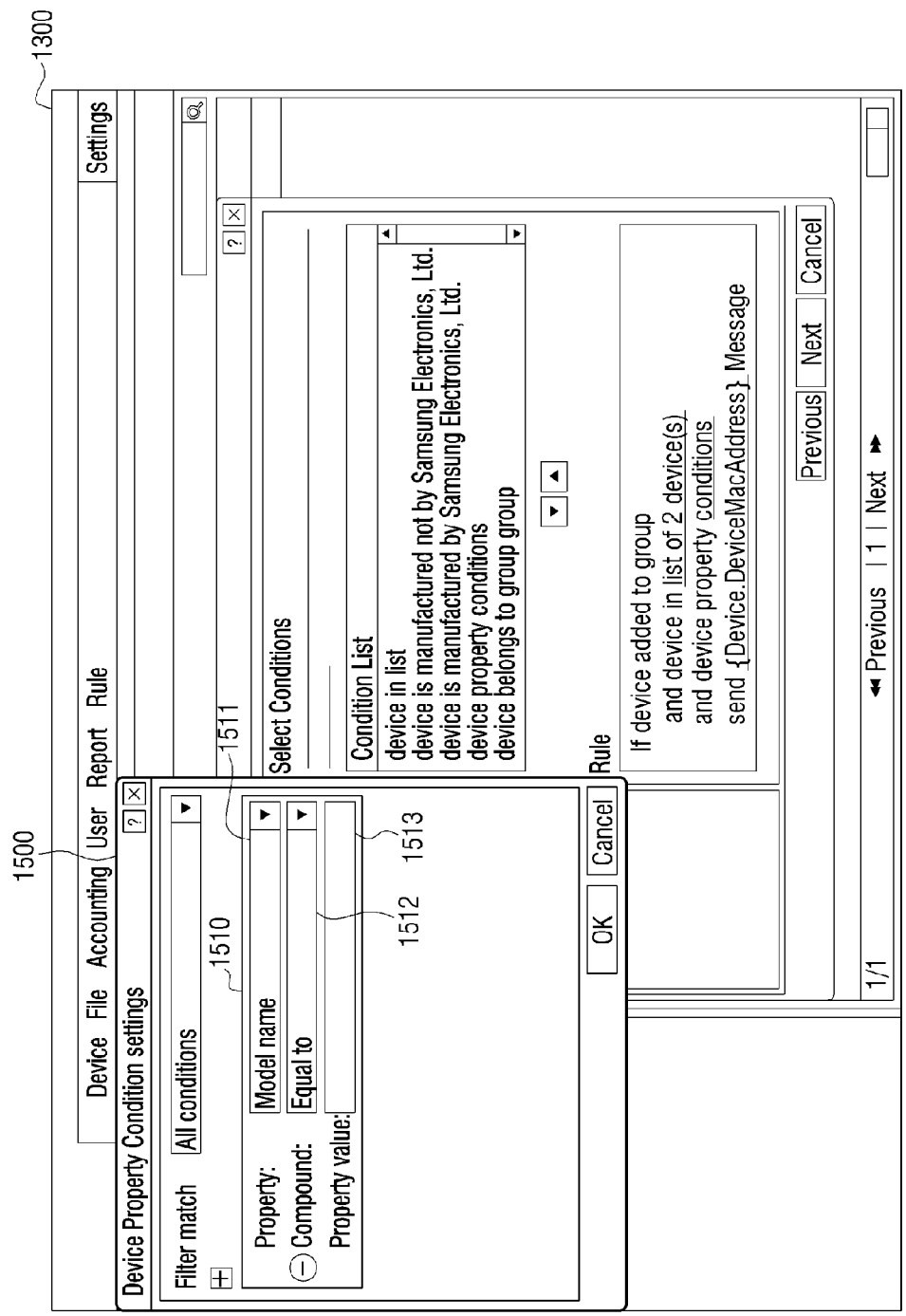

Referring to FIG. 15, the user interface unit 1300 comprising the user interface window 1500 includes a region 1510 comprising regions 1511, 1512, and 1513 to select specific setting values for the selected second condition.

Figure 16:
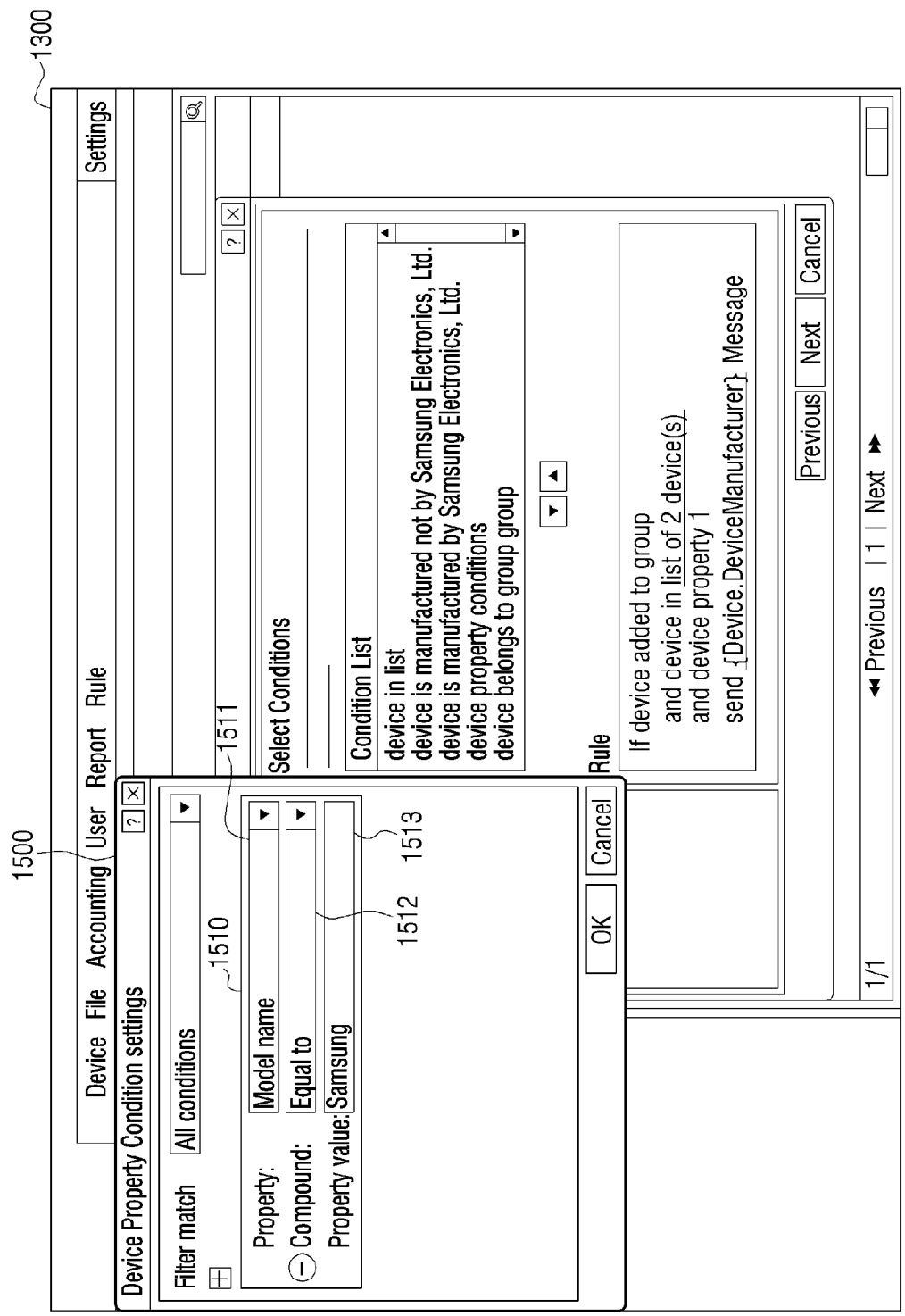
Figure 17:
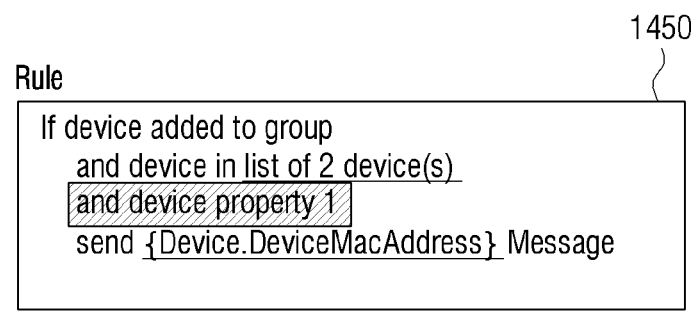

The user can set the specific second condition through the user interface window 1500. The specific setting value for the second condition input by the user is shown in FIG. 16. When such a setting value is input, the region displaying the string command 1450 of FIG. 17 is changed to reflect the input setting value in the region 1453 displaying the second condition.

Figure 18:
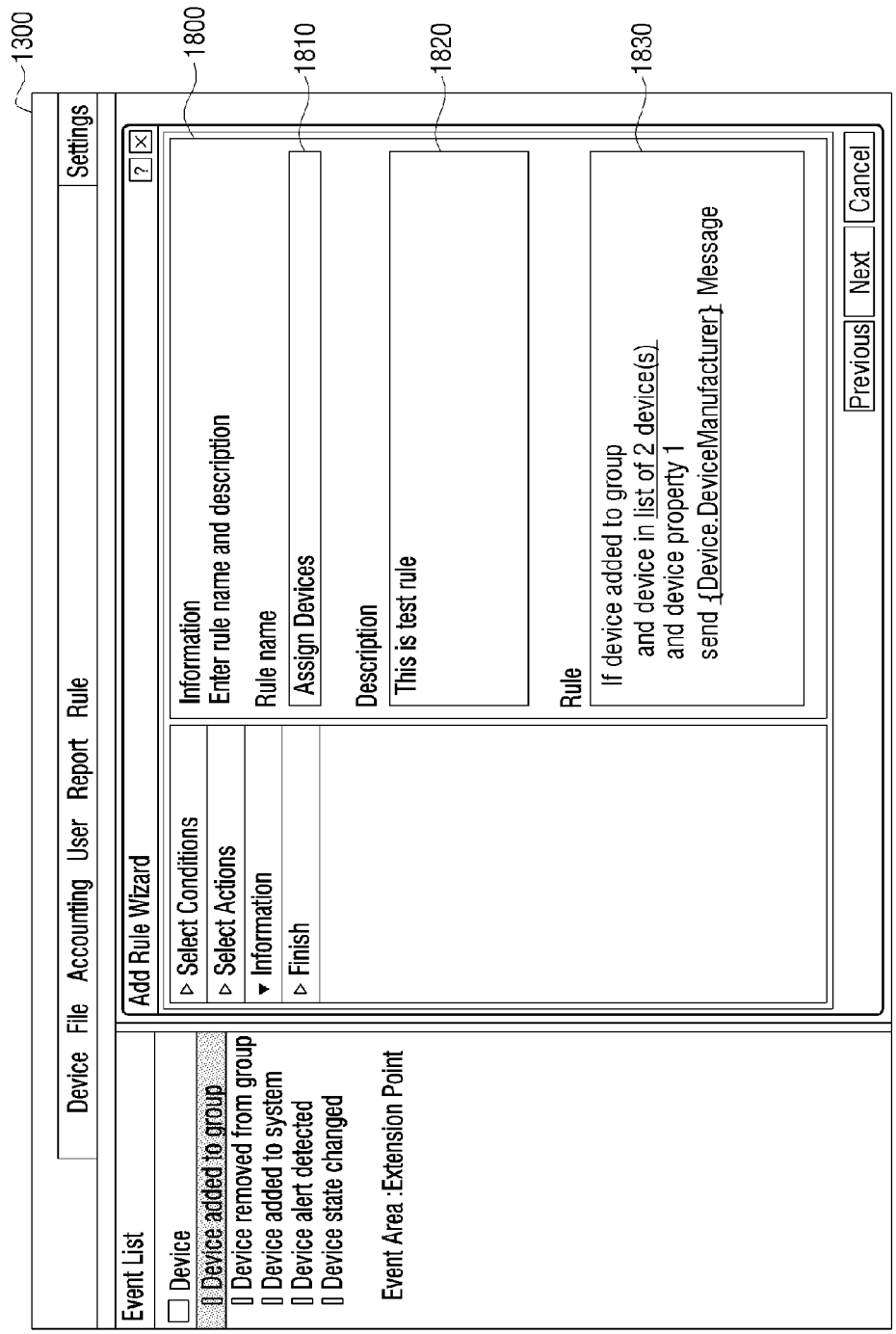

Hence, when the first condition, the second condition, and the function are selected, in that the division regions 1410, 1420, 1430, and 1440 are selected, the user interface window of FIG. 18 can be displayed.

Referring to FIG. 18, the user interface unit 1300 comprising the user interface window 1800 includes a region 1810 to input the rule name, a region 1820 to input the rule description, and a region 1830 to display the string command for the input first condition, input second condition, and input function.

When the first condition, the second condition, and the function are selected as above, the virtual bundle including the first condition, the second condition, and the function is generated as mentioned earlier.

Figure 19:
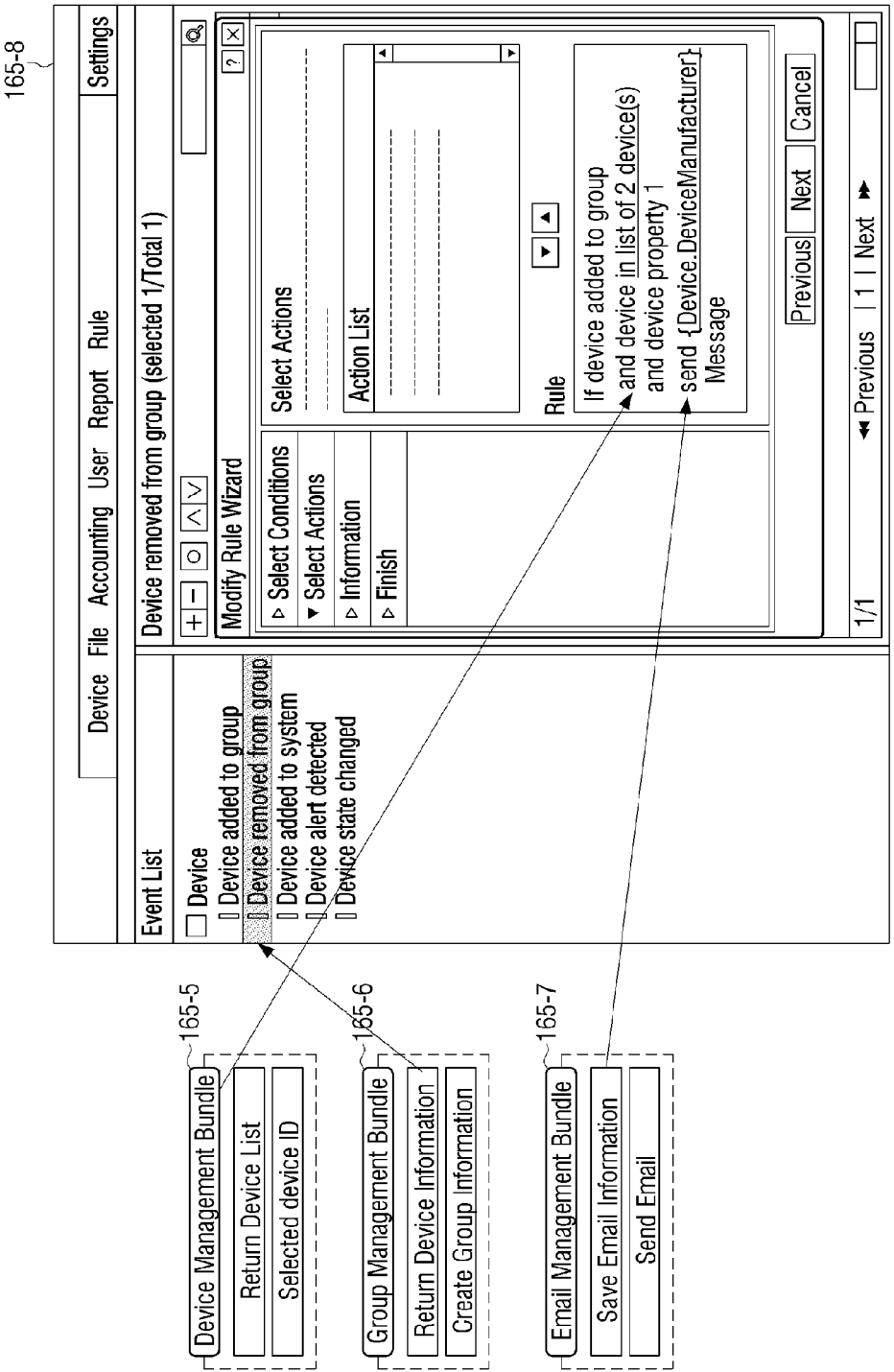
FIG. 19 is a view to explain a structure of a new bundle generated under a new regulation.

FIG. 19 is a diagram illustrating a structure of the new bundle generated according to the new rule.

Referring to FIG. 19, the pre-installed bundle 165-6 corresponds to the first condition, the pre-installed bundle 165-5 corresponds to the second condition, and the pre-installed bundle 165-7 corresponds to the function.

That is, as generating the new service, the user selects the function provided by the pre-installed bundle. The OSGi open platform has the information of the pre-installed bundle corresponding to each condition and function, and can provide the new service using the connection information between the bundles corresponding to the first condition, the second condition, and the function selected by the user, as shown in FIG. 19. As such, the new service can be registered by setting the OSGi, or may be registered by generating and installing the new bundle on the OSGi framework.

Figure 20:
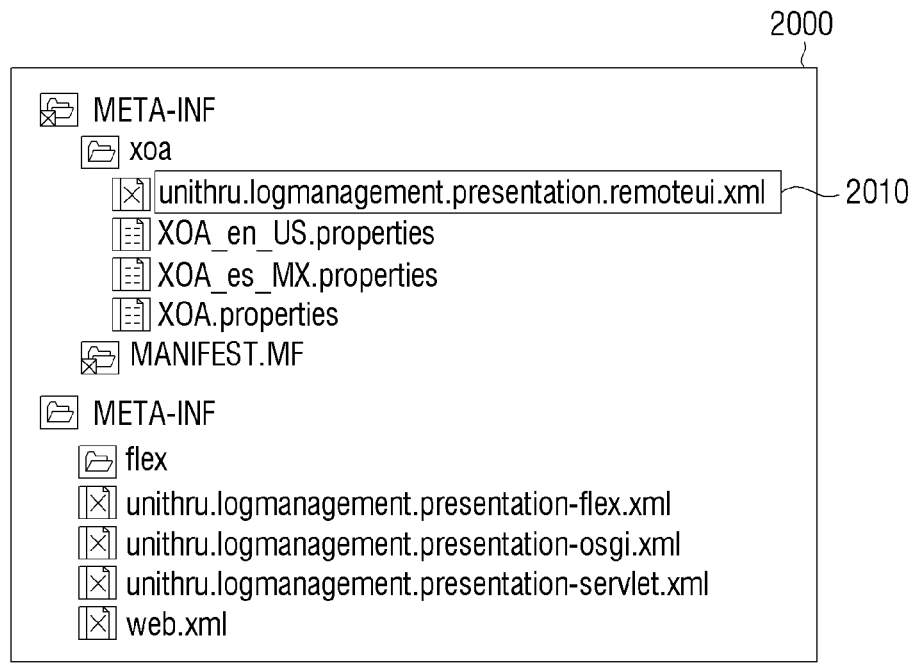

FIGS. 20 through 22 are diagrams illustrating a file structure 2000, 2100, 2200 of the bundle according to an embodiment of the present general inventive concept.

In detail, each bundle manages not only the extension function using the XML-based interface provided in the OSGi but also the function of extending the UI of each bundle to separately generate a basic XML standardization file in a presentation layer, parsing the file in the platform which is the intermediate lower layer, and reading information.

Hence, the general OSGi system requires the XML file such as xxx-flex.xml, xxx-osgi.xml, xxx-servlet.xml, and web.xml.

Besides the basic xml, it is possible to combine the function of the other bundle by adding xxx.remoteui.xml.

Accordingly, the virtual bundle according to an embodiment of the present general inventive concept includes a file remotui.xml 2010 which refers to the requisite XML and the other bundle.

An example of the file remotui.xml 2010 of FIG. 20 is depicted in FIG. 21.

Hence, the OSGi open platform registers the function (Action) to the Open Platform in the declared value using "RESOURCE.RBTA.ACTIONS_MENU" 2110. The value indicated by the function (Action) can be displayed per language selected by "devicemgm.rbta.configuration.template.action.key" 2120 and "com.samsung.solution.app.devicemgt.central.localapi.configuration.model.DeviceConfigurationTemplate" 2130 using the key value. Herein, "DeviceConfigurationTemplateAction" is the key value and links the XML value for connecting the screen required for the user to set the specific value.

The higher key value 'DeviceConfigurationTemplateAction' is connected to declare an address of the pop-up window connected when the user clicks the linked screen in order to set the specific value in the UI environment, which is represented as "/app.devicemgt.central.web/client/AppDeviceMgtCentral_configurationTemplateRbtaAction.swf" 2210.

Figure 23:
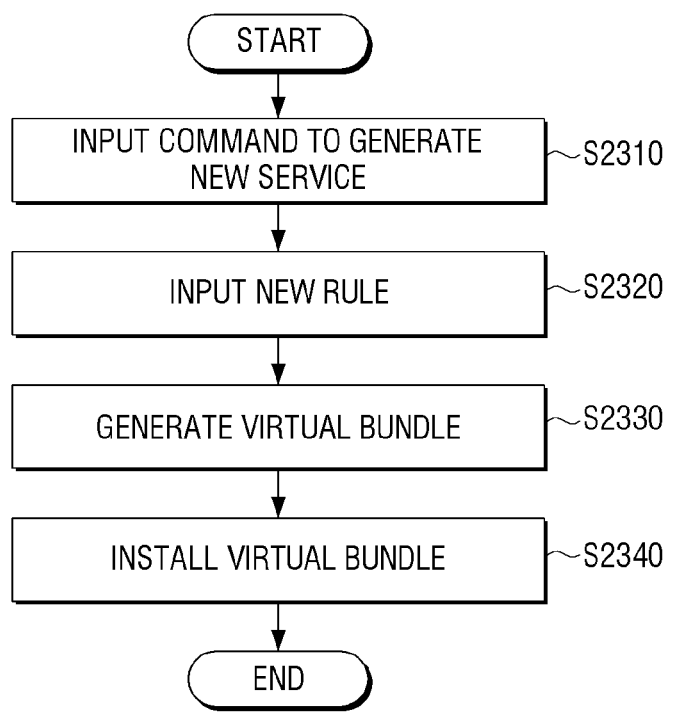
FIG. 23 is a flowchart to explain a method of installing a service according to an exemplary embodiment of the present general inventive concept.

FIG. 23 is a flowchart of a method of installing the service according to an embodiment of the present general inventive concept.

Referring to FIG. 23, the new service generation command is input (S2310).

When the new service generation command is input, the new rule is input (S2320). In detail, the user can select the first condition, the second condition, and the function as shown in FIGS. 12 through 18.

The virtual bundle is generated according to the selected new rule (S2330), and the generated virtual bundle is installed on the OSGi platform (S2340).

The service installation method according to an embodiment of the present general inventive concept can generate the new service by selecting the first condition, the second condition, and the function through the user interface window, to thus enhance the user convenience. Also, the service installation method can filter the main function using the second condition more minutely, rather than immediately performing the particular function corresponding to the particular event. The service installation method of FIG. 23 can be realized on the management server 100 of FIG. 2 or the image forming apparatus 200 of FIG. 3, or may be executed on a other management server or a other image forming apparatus.

The service installation method as stated above can be embodied as at least one execution program to execute the service installation method, and the execution program can be stored to a computer-readable recording medium.

Accordingly, the blocks of the present general inventive concept can be realized as computer-readable codes on the computer-readable recording medium. The computer-readable recording medium can be a device capable of storing data readable by a computer system.

For example, the computer-readable recording medium can include ROM, RAM, CD-ROMs, magnetic tapes, floppy discs, optical discs, optical data storage devices, and image display devices including the storage device such as TV. The computer-readable codes can be embodied as a computer data signal of carrier.

Figure 24:
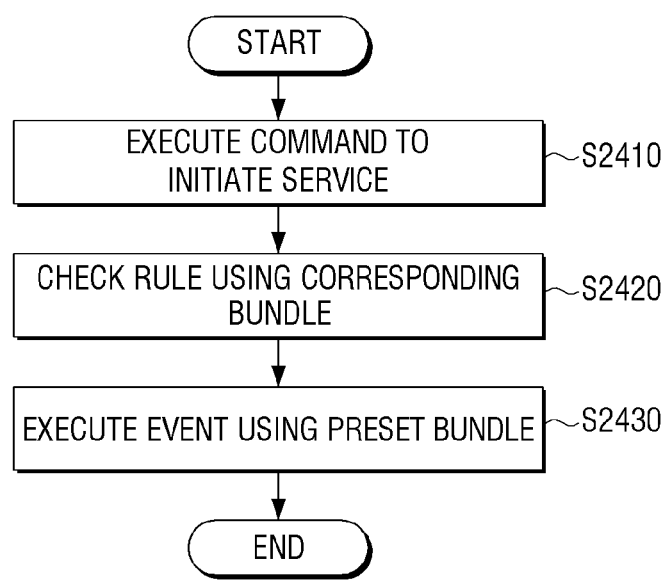
FIG. 24 is a flowchart to explain a method of providing a service according to an exemplary embodiment of the present general inventive concept.

FIG. 24 is a flowchart of a method of providing the service according to an embodiment of the present general inventive concept.

Referring to FIG. 24, when the new service is registered, as shown in FIG. 23, and the corresponding service is initiated (S2410), the method determines whether the event corresponding to the first condition and the second condition occurs, using the service engine of the bundles corresponding to the first condition and the second condition selected (S2420).

When the event corresponding to the first condition and the second condition occurs, the method conducts the service corresponding to the function using the engine of the preset bundle corresponding to the function of the new service (S2430).

The service providing method according to an embodiment of the present general inventive concept can generate the new service by selecting the first condition, the second condition, and the function through the user interface window, to thus enhance the user convenience. Also, the service providing method can filter the main function using the second condition more minutely, rather than immediately performing the particular function corresponding to the particular event. The service providing method of FIG. 24 can be realized on the management server 100 of FIG. 2 or the image forming apparatus 200 of FIG. 3, or may be executed on a other management server or a other image forming apparatus.

The service providing method as stated above can be embodied as at least one execution program to execute the service providing method, and the execution program can be stored to a computer-readable recording medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A management server providing an Open Service Gateway initiative (OSGi)-based service, comprising:
    at least one hardware processor configured to implement:
    a user interface unit to receive UI information to configure a user interface to provide a new service and to receive a selection of a plurality of functions within a plurality of bundles pre-installed in an OSGi framework to perform the new service;
    a generation unit to generate a virtual bundle corresponding to the new service including connection information for the selected plurality of functions; and
    an installation unit to install and register the generated virtual bundle in the OSGi framework as a new bundle to provide the new service,
    wherein the user interface unit displays functions of each of the plurality of bundles pre-installed in the OSGi framework distinctively by dividing the functions into three classes, and receives the selection of the plurality of functions to perform the new service from among the displayed functions.
    wherein the three classes include functions to be performed in the management server in case a selected first condition corresponding to a possible event in the management server, and a selected second condition corresponding to an event corresponding to the first condition, are both satisfied.

2. The management server as claimed in claim 1, wherein the UI information is information regarding an image of a new user interface window or information regarding a user interface window provided by a pre-installed bundle.

3. The management server as claimed in claim 1, wherein the information of a bundle pre-installed in an OSGi framework is written in eXtensible Markup Language (XML).

4. The management server as claimed in claim 1, further comprising:
    a control unit to perform a plurality of functions using a service engine of bundles corresponding to each of the plurality of functions to perform the new service when a request for executing the new service is received.

5. The management server as claimed in claim 4, wherein the control unit controls the user interface unit to display a result of executing the plurality of functions based on the input UI information.

6. The management server as claimed in claim 1, wherein the management server is connected to an image forming apparatus and manages at least one of a function of the connected image forming apparatus, charging, and security setting.

7. An image forming apparatus providing an Open Service Gateway initiative (OSGi)-based service, comprising:
    at least one hardware processor configured to implement:
    a user interface unit to receive UI information to configure a user interface to provide a new service by receiving a selection of a plurality of functions within a plurality of bundles pre-installed in an OSGI framework to perform the new service using the plurality of bundles;
    a generation unit to generate a virtual bundle corresponding to the new service including connection information for the selected plurality of functions; and
    an installation unit to install and register the generated virtual bundle in the OSGi framework as a new bundle to provide the new service,
    wherein the user interface unit displays functions of each of the plurality of bundles pre-installed in the OSGi framework distinctively by dividing the functions into three classes, and receives the selection of the plurality of functions to perform the new service from among the displayed functions, and wherein the three classes include functions to be performed in the management server in case a selected first condition corresponding to a possible event in the management server, and a selected second condition corresponding to an event corresponding to the first condition, are both satisfied.

8. A method of installing an Open Service Gateway initiative (OSGi)-based service, comprising:

receiving UI information to configure a user interface to provide a new service by selecting a plurality of functions within a plurality of bundles pre-installed in an OSGI framework to perform the new service using the plurality of bundles;

generating, using at least one hardware processor, a virtual bundle corresponding to the new service including connection information for the selected plurality of functions; and installing and registering, using the at least one hardware processor, the generated virtual bundle in the OSGi framework as a new bundle to provide the new service, wherein the receiving a plurality of functions comprises:

displaying functions of each of the plurality of bundles pre-installed in the OSGi framework distinctively by dividing the functions into three classes; and receiving the selection of the plurality of functions to perform the new service from among the displayed functions, and wherein the three classes include functions to be performed in the management server in case a selected first condition corresponding to a possible event in the management server, and a selected second condition corresponding to an event corresponding to the first condition, are both satisfied.

9. The method as claimed in claim 8, wherein the receiving UI information comprising receiving UI information regarding an image of a new user interface window or information regarding a user interface window provided by a pre-installed bundle.

10. The method as claimed in claim 8, wherein the generating a virtual bundle comprises generating a virtual bundle including the information of a bundle pre-installed in an OSGi framework written in eXtensible Markup Language (XML).

11. The method as claimed in claim 8, further comprising:
performing a plurality of functions using a service engine of bundles corresponding to each of the plurality of functions to perform the new service when a request to execute the new service is received.

12. The method as claimed in claim 11, further comprising:
displaying a result of executing the plurality of functions based on the input UI information.

13. The method as claimed in claim 8, wherein installing the generated virtual bundle in the OSGi framework comprising installing the generated virtual bundle in an OSGi framework of an image forming apparatus or an OSGi framework of a management server connected to the image forming apparatus.

14. A non-transitory computer readable recording medium including instructions to control at least one hardware processor to perform a method of installing an OSGi-based service, the method of installing an OSGi-based service comprising:

receiving UI information to configure a user interface to provide a new service by selecting a plurality of functions within a plurality of bundles pre-installed in an OSGi framework to perform the new service;

generating a virtual bundle corresponding to the new service including connection information regarding the pre-installed bundles corresponding to the selected plurality of functions; and installing and registering the generated virtual bundle in the OSGi framework as a new bundle to provide the new service, wherein the receiving a plurality of functions comprises:

displaying functions of each of the plurality of bundles pre-installed in the OSGi framework distinctively by dividing the functions into three classes; and receiving the selection of the plurality of functions to perform the new service from among the displayed functions, wherein the three classes include functions to be performed in the management server in case a selected first condition corresponding to a possible event in the management server, and a selected second condition corresponding to an event corresponding to the first condition, are both satisfied.

* * * * *